United States Patent
Tamura

(10) Patent No.: US 7,132,646 B2
(45) Date of Patent: Nov. 7, 2006

(54) SIGNAL LIGHT INTERRUPTION DETECTING METHOD AND OPTICAL AMPLIFIER USING SAME

(75) Inventor: Yuji Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/901,985

(22) Filed: Jul. 30, 2004

(65) Prior Publication Data

US 2005/0218310 A1    Oct. 6, 2005

(30) Foreign Application Priority Data

Mar. 31, 2004    (JP) .............................. 2004-106427

(51) Int. Cl.
| | |
|---|---|
| G01J 1/04 | (2006.01) |
| G01J 1/42 | (2006.01) |
| G01J 5/08 | (2006.01) |
| H03F 3/08 | (2006.01) |
| H01S 3/00 | (2006.01) |

(52) U.S. Cl. .......................... 250/227.14; 250/214 A; 359/334

(58) Field of Classification Search ............ 250/214 A, 250/214 LA, 227.14–227.19; 359/334; 398/37
See application file for complete search history.

(56) References Cited

U.S. PATENT DOCUMENTS

| 4,977,593 A * | 12/1990 | Ballance ......................... 380/2 |
| 5,282,074 A * | 1/1994 | Miyazaki et al. ............. 398/26 |
| 6,188,508 B1 * | 2/2001 | Horiuchi et al. ............. 359/334 |
| 2003/0137720 A1 * | 7/2003 | Onaka et al. ................ 359/334 |

FOREIGN PATENT DOCUMENTS

| JP | 02-104153 | 4/1990 |
| JP | 62-092552 | 4/1997 |
| JP | 10-229365 | 8/1998 |

OTHER PUBLICATIONS

Boston Electronics, "What is a Lock-In Amplifier?", http://www.boselec.com/products/siglimwhat.html.*

* cited by examiner

Primary Examiner—Thanh X. Luu
Assistant Examiner—Suezu Ellis
(74) Attorney, Agent, or Firm—Staas & Halsey LLP

(57) ABSTRACT

In an optical amplifier of the present invention, a part of an input light output from a transmission path fiber is branched as a monitor light, a frequency component corresponding to a period at which a header area of a framed signal light appears, is extracted, and when a voltage level of a direct-current signal obtained by direct-current converting the frequency component becomes lower than a reference voltage, the input interruption of the signal light is detected, to perform a shut-down control of a pumping light source. Thus, an optical amplifier of low cost capable of suppressing an influence of a noise light while ensuring the immediacy, is provided.

20 Claims, 4 Drawing Sheets

SIGNAL LIGHT INTERRUPTION DETECTING METHOD AND OPTICAL AMPLIFIER USING SAME

BACKGROUND OF THE INVENTION

1. Field of the Invention

The present invention relates to a technique for detecting an interruption state of a signal light in an optical communication field, and in particular, to a signal light interruption detecting method capable of reliably detecting the input interruption of a signal light while suppressing an influence of a noise light, when the signal light is amplified using an optical amplifier, and an optical amplifier using the same.

2. Description of the Related Art

An optical amplifier is an instrument which amplifies a signal light just as it is, and for example, there is a Raman amplifier using a transmission path fiber as an amplification medium, a rare-earth element doped fiber amplifier using a rare-earth element doped fiber as an amplification medium or the like. In the Raman amplifier described above, a pumping light of high level (generally, several 100 mW or above) is given to the transmission path fiber in order to cause the Raman amplification in the transmission path fiber. Therefore, for example, in the case where a breakage or the like occurs in the transmission path fiber, there is a possibility that the pumping light of high level is output from the broken portion to the outside, to cause a problem in the safety of maintenance worker. Further, in the rare-earth element doped fiber amplifier described above, in the case where an input of signal light is interrupted due to an occurrence of failure or the like on the upstream side, since there is a possibility that an internal gain is increased in a silence state, and accordingly, a signal light of excess power is transiently output when the signal light is restored, an optical transmission apparatus on the downstream side may be damaged. In order to avoid such a situation, it is necessary to perform an interruption detection of the signal light input to the optical amplifier, to stop the supply of pumping light in the Raman amplifier or an optical amplification operation in the rare-earth element doped fiber amplifier according to the detection result, or to perform a so-called shut-down control for suppressing the power of the pumping light to a low level at which no problem occurs.

As a conventional signal light interruption detecting method in an optical communication system, there has been known, for example, a method of detecting the presence or absence of a signal light based on the input light power measured by an input light monitor which is provided in an optical amplifier disposed in a transmission and reception terminal station or a repeater station, or a method of extracting a clock component or the like of a light received by a reception terminal station, to perform an interruption detection according to the reception state (refer to Japanese Laid Open Patent No. 2-104153 and Japanese Laid Open Patent No. 10-229365).

However, the conventional signal light interruption detecting method as described above has the following problems. In the signal light interruption detecting method utilizing the input light monitor of the optical amplifier, in the case where the optical amplifier is, for example, a Raman amplifier, the input light monitor is given with a noise light which is generated due to the Raman scattering of a pumping light supplied to a transmission path fiber, together with a signal light which is Raman amplified in the transmission path fiber on an input side. Even when the signal light is interrupted due to a breakage or the like of the transmission path fiber, if the broken portion is apart from the Raman amplifier by a distance of certain degree, this noise light is generated. Therefore, even if the signal light is not inputted due to the occurrence of breakage or the like of the transmission path fiber, it is impossible to detect the input interruption of the signal light due to the existence of the noise light. This is because a difference between the levels of the signal light and the noise light becomes small in the case where a level of the signal light inputted to the light monitor is relatively low Further, in the method of extracting the clock component or the like in the reception terminal station to perform the interruption detection, since the interruption detection result is transmitted on the optical communication system to be transmitted to the optical amplifier on the upstream side, so that a shut-down control is performed, there is caused a delay until a state of the optical amplifier is actually controlled after the signal light interruption is detected, resulting in a problem of lack of immediacy. Moreover, in a system for transmitting the signal light of high bit rate exceeding for example 10 Gb/s, a circuit corresponding to a high frequency is required to extract the clock component in the reception terminal station. However, such a circuit is generally expensive, and therefore, the cost required for realizing the signal light interruption detection is increased.

SUMMARY OF THE INVENTION

The present invention has been accomplished in view of the above problems, and has an object to provide a signal light interruption detecting method of low cost, capable of suppressing an influence of a noise light while ensuring the immediacy, and an optical amplifier using the same.

In order to achieve the above object, a signal light interruption detecting method according to the present invention, for detecting the presence or absence of a framed signal light input to an optical amplifier, comprises: branching a part of a light input to the optical amplifier as a monitor light; receiving the branched monitor light to convert it into an electrical signal; extracting a frequency component corresponding to a period at which a header area of the signal light appears, from the converted electrical signal; and detecting whether or not the signal light is input to the optical amplifier, based on the amplitude of the extracted frequency component.

Further, an optical amplifier according to the present invention, which supplies a pumping light to an amplification medium to amplify a framed signal light propagated through the amplification medium, and also detects the input interruption of the signal light to perform a shut-down control of the pumping light, comprises: a branching section that branches a part of an input light as a monitor light; a light receiving section that receives the monitor light branched in the branching section to convert it into an electrical signal; an extracting section that extracts a frequency component corresponding to a period at which a header area of the signal light appears, from the electrical signal converted in the light receiving section; a detecting section that detects whether or not the signal light is input, based on the amplitude of the frequency component extracted in the extracting section; and a control section that executes a shut-down control of the pumping light when the input interruption of the signal light is detected in the detecting section.

In the signal light interruption detecting method as described above and the optical amplifier using the same, the frequency component corresponding to the period at which the header area of the framed signal light appears, is extracted from the electrical signal obtained by photo-electrically converting the monitor light which is obtained by branching a part of the input light, and it is detected whether or not the signal light is input to the optical amplifier, based on the amplitude of the frequency component. Therefore, an interruption state of the signal light input to the optical amplifier is detected without a substantial influence of a noise light generated with the amplification of the signal light.

As described in the above, according to the present invention, since the interruption state of the signal light input to the optical amplifier can be detected with high accuracy while suppressing the influence of the noise light, and the shut-down control of the pumping light is performed in accordance with the result of the signal light interruption detection, it becomes possible to control the power of the pumping light to a safe level immediately after the occurrence of signal light input interruption. Further, the signal light interruption detection according to the present invention can be applied to a signal light of high bit rate using an electrical circuit of low frequency corresponding to a frame period of the signal light, and therefore, it is possible to achieve the reduction of cost required for realizing the signal light interruption detection.

Other objects, features and advantages of the present invention will become apparent from the following explanation of the embodiments, in conjunction with the appended drawings.

DESCRIPTION OF THE PREFERRED EMBODIMENTS

Figure 1:
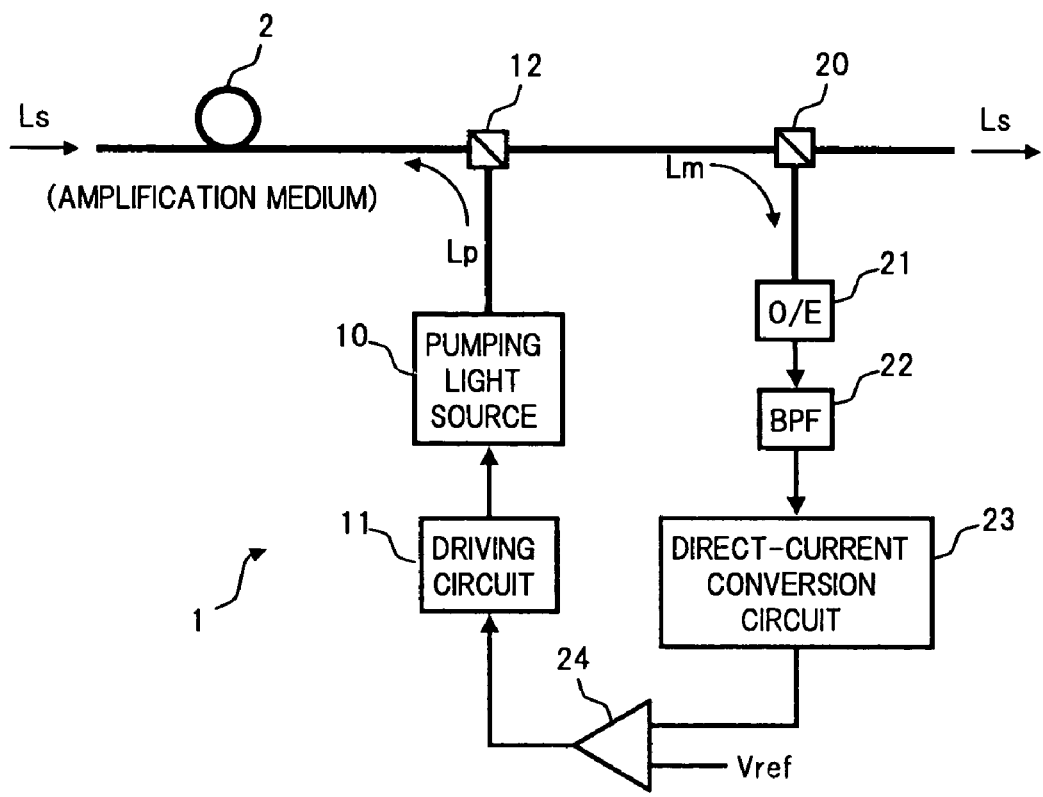
FIG. 1 is a block diagram showing a configuration of an optical amplifier according to a first embodiment of the present invention.

There will be described embodiments for implementing a signal light interruption detecting method of the present invention and an optical amplifier using the same, with reference to the accompanying drawings. The same reference numerals denote the same or equivalent parts in all drawings.

FIG. 1 is a block diagram showing a configuration of a first embodiment of an optical amplifier using the signal light interruption method of the present invention.

In FIG. 1, an optical amplifier 1 in the present embodiment comprises, for example, a pumping light source 10, a driving circuit 11 and a multiplexer 12, for supplying a pumping light Lp for Raman amplification to a transmission path fiber 2 connected to an input end, and a branching device 20, a light receiver (O/E) 21, a bandpass filter (BPF) 22, a direct-current conversion circuit 23 and a comparator 24, for performing an interruption detection of a signal light Ls which is propagated through the transmission path fiber 2 to be input to the optical amplifier 1.

The pumping light source 10 generates the pumping light Lp which is capable of amplifying the signal light Ls propagated through the transmission path fiber 2 utilizing a Raman effect being a non-linear phenomenon. Further, the driving circuit 11 is for driving to control the pumping light source 10 and has a function of shutting down the pumping light Lp in accordance with information relating to the presence or absence of the signal light Ls, which is output from the comparator 24 to be described later.

The multiplexer 12 multiplexes the pumping light Lp output from the pumping light source 10 and the signal light Ls propagated through the transmission path fiber 2, to give the pumping light Lp propagated in a direction opposite to a propagation direction of the signal light Ls, to the transmission path fiber 2.

Note, the Raman effect described above is a phenomenon where a gain peak appears at a frequency lower than a frequency of the pumping light Lp by 13.2 THz, in the case where, for example, a silica optical fiber is used as the transmission path fiber 2. In a 1.5 μm band, the signal light Ls in a wavelength band apart from a pumping light wavelength to a long wavelength side by about 100 nm, is Raman amplified. Further, when the signal light Ls is Raman amplified, a noise light due to the induced Raman scattering caused by the pumping light is generated inside an amplification medium, and this noise light is input to the optical amplifier 1 together with the Raman amplified signal light Ls.

The branching device 20 branches a part of a light (to be specific, the signal light Ls and the noise light) passed through the multiplexer 12 as a monitor light Lm, to give the monitor light Lm to the light receiver 21. The light receiver 21 receives the monitor light Lm from the branching device 20, to convert it into an electrical signal, and outputs a signal whose voltage level is changed according to the power of the monitor light Lm, to the bandpass filter 22.

Figure 2:
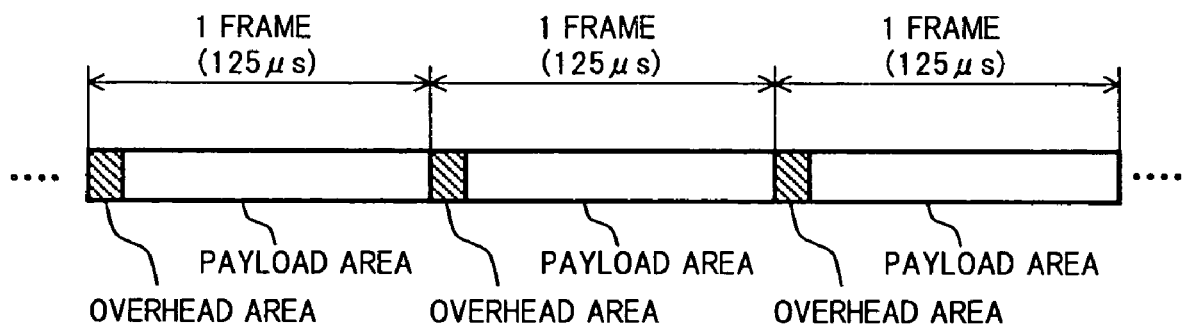
FIG. 2 is a diagram showing a frame constitution of a signal light in the first embodiment.

The bandpass filter 22 extracts a frequency component corresponding to a period (hereunder, to be referred to as a frame period on occasion) at which a header area of the framed signal light Ls appears, from the electrical signal output from the light receiver 21, to output the frequency component to the direct-current conversion circuit 23. Here, for example as shown in FIG. 2, on the assumption of the signal light Ls framed with reference to SDH/SONET (Synchronous Digital Hierarchy/Synchronous Optical Network) which is international standards of a high speed digital communication system using an optical fiber, a center frequency of a passband of the bandpass filter 22 is set to 8 kHz (=1/125 μs), corresponding to the frame period of 125 μs in the signal light Ls.

Figure 3:
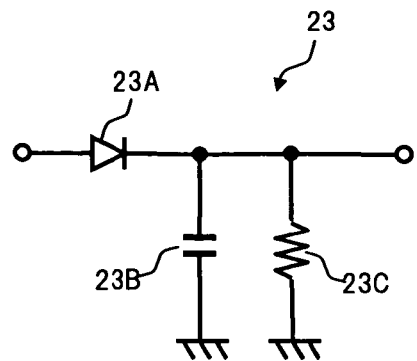
FIG. 3 is a diagram showing a specific constitutional example of a direct-current conversion circuit used in the first embodiment.

The direct-current conversion circuit 23 converts the amplitude of the frequency component of 8 kHz extracted in the bandpass filter 22 into a direct-current voltage, to give the direct-current voltage to the comparator 24. As a specific configuration of this direct-current conversion circuit 23, for example as shown in FIG. 3, it is possible to apply a typical circuit configuration in which a diode 23A, a capacitor 23B and a resistor 23C are combined.

The comparator 24 compares a voltage level of the direct-current signal from the direct-current conversion circuit 23, which is given to one of input terminals thereof, with a previously set reference voltage Vref, which is given to the other input terminal, and if the voltage level of the direct-current signal is the reference voltage Vref or above, detects that the signal light Ls is input, while detecting the input interruption of the signal light Ls if the voltage level of the direct-current signal is lower than the reference voltage Vref, to output information indicating the detection result to the driving circuit 11.

Next an operation of the optical amplifier 1 in the first embodiment will be described.

In the transmission system with reference to SDH/SONET as described above, a header area holding management information of a network and a payload area holding transmission signal information are transmitted in each frame unit of 125 μs (refer to FIG. 2), and therefore, a fixed frequency component corresponding to a period at which the header area appears, necessarily exists in the signal light Ls. In the present invention, paying an attention to the frequency component corresponding to the frame period contained in the framed signal light Ls, the frequency component is detected from the light containing the noise light with the Raman amplification, input to the optical amplifier 1, thereby enabling the detection of the presence or absence of the signal light Ls without the influence of the noise light.

Figure 4:
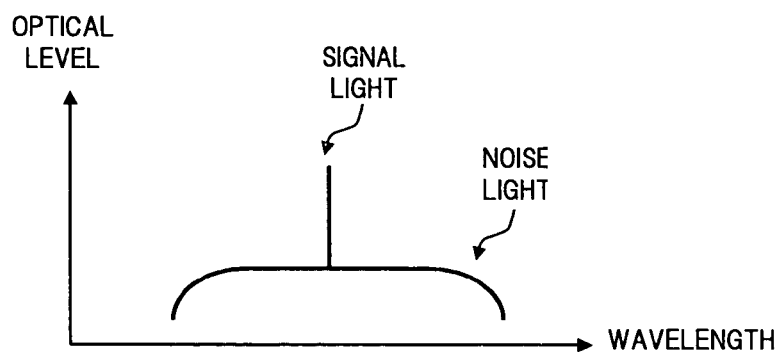
FIG. 4 is a diagram for explaining a Raman amplification operation in the first embodiment.
Figure 4:
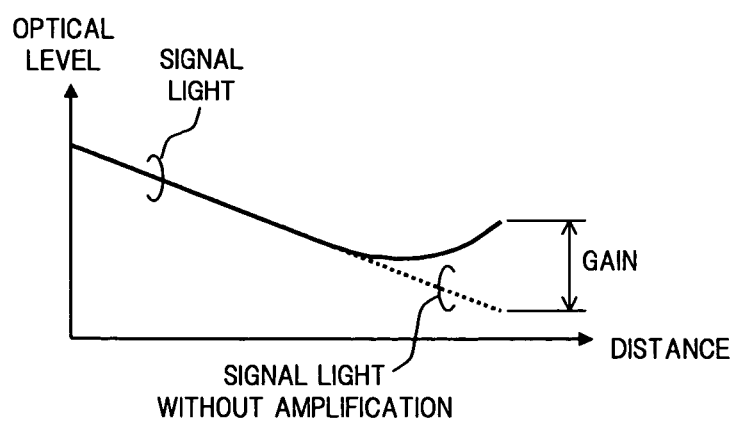

Specifically, in a state where the optical amplifier 1 is operated, that is, in a state where the pumping light source 10 is driven by the driving circuit 11 and the pumping light Lp is supplied to the transmission path fiber 2 via the multiplexer 12, a part of the light input to the optical amplifier 1 from the transmission path fiber 2 is branched by the branching device 20 as the monitor light Lm. The monitor light Lm contains, for example as shown in the upper stage of FIG. 4, the noise light due to the induced Raman scattering caused by the pumping light Lp, in addition to the signal light Ls. Even when the signal light is interrupted due to a breakage or the like of the transmission path fiber, if the broken portion is apart from the optical amplifier 1 by a distance of certain degree, the noise light of a level according to the distance is branched as the monitor light Lm. Note, the signal light Ls is propagated through the backwardly pumped transmission path fiber 2, to be Raman amplified in accordance with an energy level diagram as shown in the lower stage of FIG. 4 for example.

The monitor light Lm described above is sent from the branching device 20 to the light receiver 21 to be photoelectrically converted, and the electrical signal whose voltage level is changed according to the power of the monitor light Lm is output to the bandpass filter 22. The electrical signal output from the light receiver 21 to the bandpass filter 22, contains a component (white noise component) which does not have a specific frequency corresponding to the noise light, regardless of the presence or absence of the signal light Ls, and accordingly the frequency component of 8 kHz corresponding to the frame period of the signal light Ls appears only when the signal light Ls is input. Accordingly, the frequency component of 8 kHz is extracted in the bandpass filter 22, so that the component corresponding to the noise light is suppressed, thereby enabling the detection of the presence or absence of the signal light Ls based on the amplitude of the extracted frequency component of 8 kHz (here, the direct-current voltage level converted in the direct-current conversion circuit 23).

Note, although the frequency component of 8 kHz extracted in the bandpass filter 22 contains slightly the component corresponding to the noise light, a level of the noise light is sufficiently lower than the component corresponding to the frame period of the signal light Ls, and therefore, the influence of the noise light can be substantially neglected. Further, since a level of the whole frequency component of 8 kHz extracted in the bandpass filter 22 becomes relatively low, the electrical signal passed through the bandpass filter 22 may be amplified to a required level using an amplifier.

For an output signal from the direct-current conversion circuit 23, the direct-current voltage level thereof is compared with the reference voltage Vref in the comparator 24. If the direct-current voltage level is the reference voltage Vref or above, it is detected that the signal light Ls is input, and the information notifying the input of the signal light Ls is sent to the driving circuit 11 so that the pumping light source 10 continues to be driven. On the other hand, if the direct-current voltage level becomes lower than the reference voltage Vref, it is detected that the input of the signal light Ls is interrupted, and the information notifying the input interruption of the signal light Ls is sent to the driving circuit 11, so that the driving circuit 11 stops the supply of the pumping light Lp or executes a shut-down control of the pumping light source 10 so as to enable the suppression of the pumping light power to a safe level.

As described in the above, according to the optical amplifier 1 in the first embodiment, the frequency component corresponding to the frame period of the signal light Ls is extracted from the input light containing the noise light with the Raman amplification, to be detected, so that the interruption detection of the signal light Ls can be performed without the influence of the noise light. Therefore, it becomes possible to perform the shut-down control of the pumping light source 10 immediately after the state where the signal light Ls is interrupted, is detected.

Note, in the first embodiment, the assumption has been made on the signal light Ls having the frame period of 125 μs with reference to SDH/SONET. However, the present invention is not limited thereto, and it is possible to apply the present invention to a framed signal light whose overhead area appears at an arbitrary period. Further, the description has been made on the distributed Raman amplifier using the transmission path fiber 22 as the amplification medium. However, the present invention can be applied to a concentrated Raman amplifier in which a fiber with a high non-linear effect is disposed as the amplification medium, separately from the transmission path fiber 2. Further, one example has been shown in which the supply of the pumping light Lp is performed by one pumping light source 11. However, the constitution may be such that pumping lights output from a plurality of pumping light sources are multiplexed with each other, to be supplied to the transmission path fiber.

Next, a second embodiment of the present invention will be described.

Figure 5:
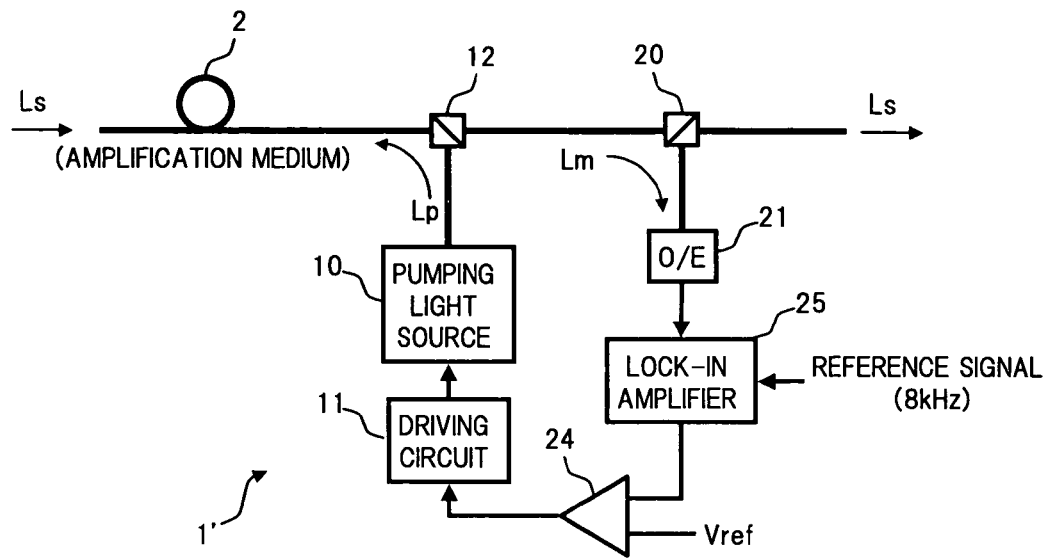
FIG. 5 is a block diagram showing a configuration of an optical amplifier according to a second embodiment of the present invention.

FIG. 5 is a block diagram showing a configuration of an optical amplifier in the second embodiment.

In FIG. 5, the configuration of an optical amplifier 1' in the present embodiment differs from the configuration of the optical amplifier 1 in the first embodiment shown in FIG. 1, in that a lock-in amplifier 25 is disposed, instead of the bandpass filter 22 and the direct-current conversion circuit 23 in the optical amplifier 1. Other constitutional elements are the same as those in the first embodiment.

Figure 6:
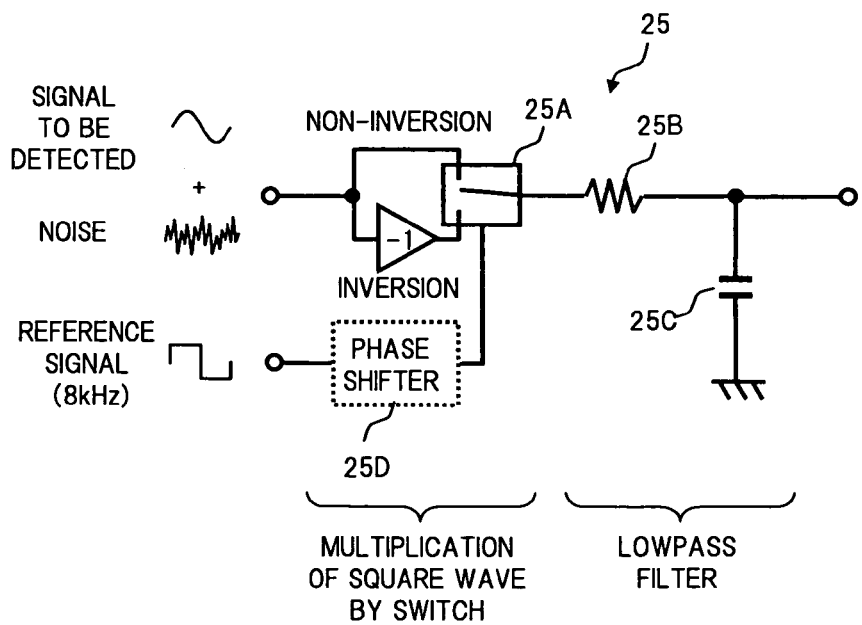
FIG. 6 is a diagram showing a specific constitutional example of a lock-in amplifier used in the second embodiment.

The lock-in amplifier 25 is a typical electrical circuit in which a frequency component matched with a reference signal is frequency converted with a synchronous detection (phase detection), to enable the elimination of noise using a lowpass filter, and specifically has a basic circuit configuration as shown in FIG. 6 for example. In the circuit configuration in FIG. 6, the electrical signal output from the light receiver 21 is input thereto, and the reference signal (square wave) having the frequency of 8 kHz is multiplied on this input signal using a switch 25A. Then, output signals of the switch 25A are averaged in the lowpass filter consisting of a resistor 25B and a capacitor 25C, and the direct-current voltage signal is output to the comparator 24. Note, the above described reference signal may be given to the switch 25A via a phase shifter 25D as shown by a dotted line in the figure.

In the optical amplifier 1' of the above configuration, as means for extracting the frequency component of 8 kHz corresponding to the frame period of the signal light Ls from the electrical signal which is photo-electrically converted in the light receiver 21 in the same manner as in the first embodiment, the lock-in amplifier 25, which is given with the reference signal having the same frequency of 8 kHz, is used, so that a narrower band filter configuration is realized compared with the case where the bandpass filter 22 is used as in the first embodiment. As a result, even a weak signal, in which the frequency component corresponding to the frame period of the signal light Ls is buried in the noise light, can be reliably detected, to be converted into the direct-current voltage. Thus, it becomes possible to perform the interruption detection of the signal light Ls, by giving the direct-current voltage signal output from the lock-in amplifier 25 to the comparator 24 to compare it with the reference voltage Vref.

Next, a third embodiment of the present invention will be described.

Figure 7:
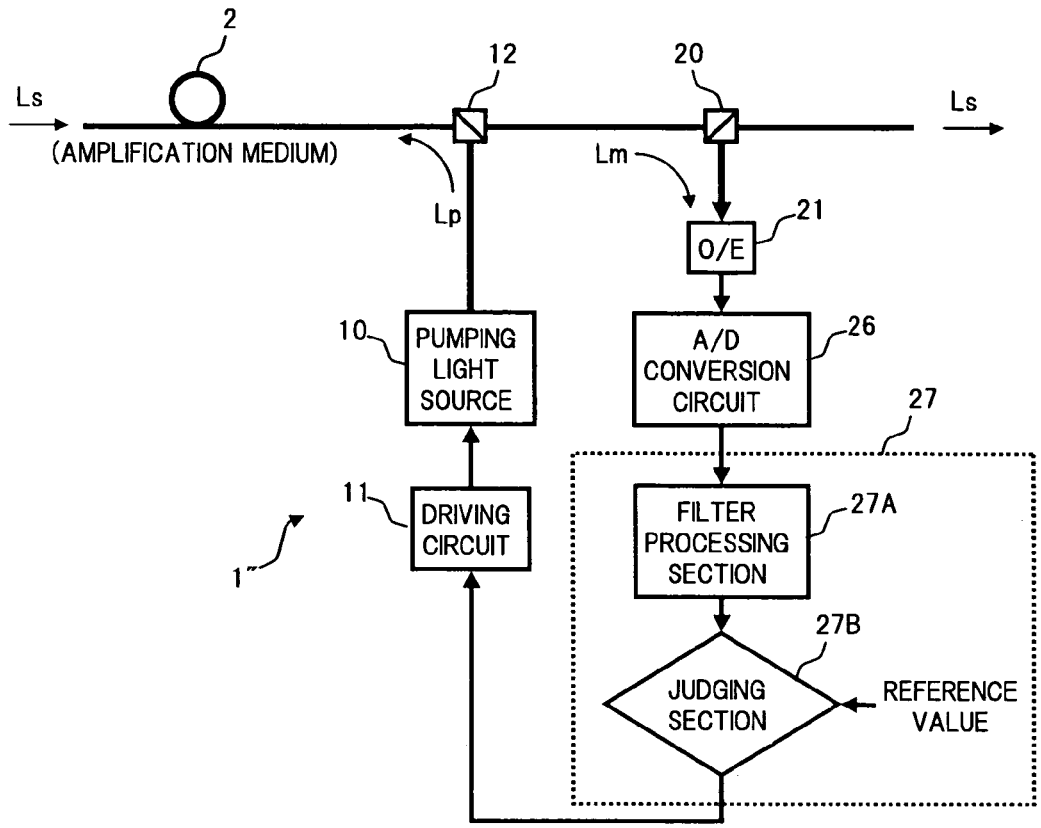
FIG. 7 is a block diagram showing a configuration of an optical amplifier according to a third embodiment of the present invention.

FIG. 7 is a block diagram showing a configuration of an optical amplifier in the third embodiment.

In FIG. 7, the configuration of an optical amplifier 1" in the present embodiment differs from the configuration of the optical amplifier 1 in the first embodiment shown in FIG. 1, in that an A/D conversion circuit 26 and a digital signal processing circuit 27 are disposed, instead of the bandpass filter 22, the direct-current conversion circuit 23 and the comparator 24 in the optical amplifier 1. Other constitutional elements are the same as those in the first embodiment.

The A/D conversion circuit 26 is a typical electrical circuit in which an analog electrical signal output from the light receiver 21 is converted into a digital signal. Since a sampling frequency in this A/D conversion circuit 26 is used for determining the accuracy of filtering process of extracting the frequency component corresponding to the frame period of the signal light Ls in the digital signal processing circuit 27, it is preferable to set the sampling frequency to be ten times or above the extracted frequency.

The digital signal processing circuit 27 is constituted by using, for example, a CPU or the like, and includes a filter processing section 27A and a judgment section 27B as a functional block thereof. Specifically, the filter processing section 27A extracts the frequency component corresponding to the frame period of the signal light Ls from the digital signal output from the A/D conversion circuit 26 using a known digital filter, for example, an FIR (finite impulse response) filter or an IIR (infinite impulse response) filter. The judgment section 27B judges the presence or absence of the signal light Ls in accordance with a previously set reference value, based on the processing result in the filter processing section 27A, to output the judgment result to the driving circuit 11.

In the optical amplifier 1" of the above configuration, as means for extracting the frequency component of 8 kHz corresponding to the frame period of the signal light Ls from the electrical signal which is photo-electrically converted in the light receiver 21 in the same manner as in the first embodiment, the digital filter is utilized. Thus, even in the case where the interruption detection of the signal light is realized by the digital signal process in such a manner, it is also possible to achieve the function and effect same as those in the first embodiment.

Note, in the third embodiment, one example has been shown in which the electrical signal photo-electrically converted in the light receiver 21 is converted into the digital signal in the A/D conversion circuit 26. However, the configuration may be such that for example the bandpass filter used in the first embodiment, the lock-in amplifier used in the second embodiment or the like is inserted between the light receiver 21 and the A/D conversion circuit 26, to extract the frequency component of 8 kHz also on the analog signal state.

Figure 8:
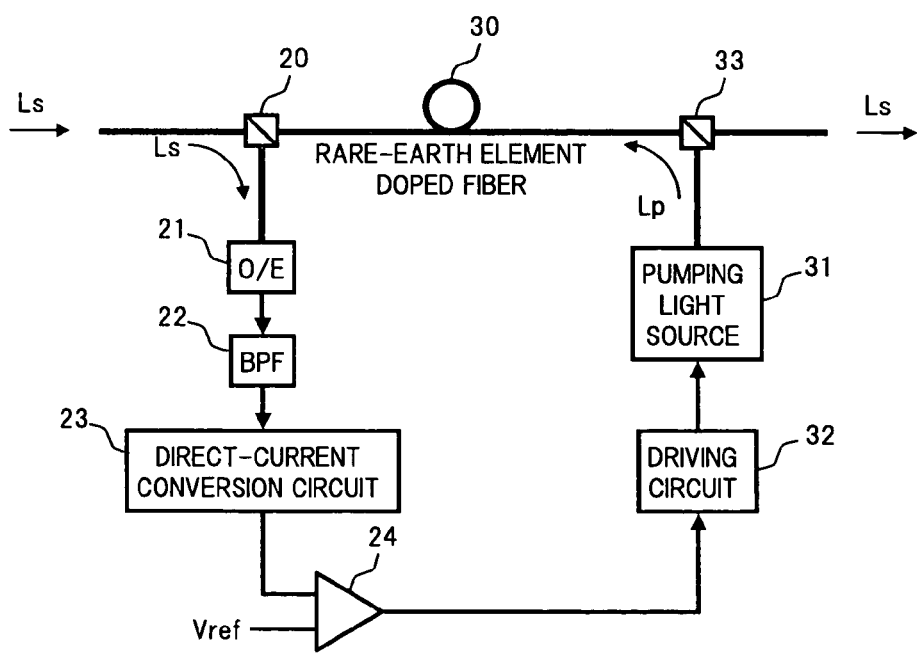
FIG. 8 is a diagram showing a constitutional example in the case where the present invention is applied to a rare-earth element doped fiber amplifier, relating to the first to third embodiments.

Moreover, in the first to third embodiment, the description has been made on the Raman amplifier using the transmission path fiber 2 as the amplification medium. However, the optical amplifier applied with the signal light interruption detecting method of the present invention is not limited thereto, and it is possible to apply the present invention to the interruption detection of input light in a known rare-earth element doped fiber amplifier as shown in FIG. 8 for example. In the constitutional example of FIG. 8, a rare-earth element doped fiber 30 is pumped by a backward pumping light Lp supplied from a pumping light source 31 via a multiplexer 33, and the presence or absence of the signal light Ls input to the rare-earth element doped fiber 30 is detected with the constitution same as that in the first embodiment, and the driving operation of the pumping light source 31 is controlled by the driving circuit 32 in accordance with the detection result.

What is claimed is:

1. A signal light interruption detecting method for detecting the presence or absence of a framed signal light input to an optical amplifier, comprising:
    branching a portion of a light inputted to said optical amplifier, the branched portion being a monitor light;
    receiving said monitor light and converting the received monitor light into an electrical signal;
    extracting a frequency component corresponding to a period at which a header area of said signal light appears, from the electrical signal; and
    detecting whether or not said signal light is inputted to said optical amplifier, based on the amplitude of said extracted frequency component.

2. A signal light interruption detecting method according to claim 1,
    wherein when one frame period of said signal light is 125 ms, a frequency component of 8 kHz is extracted from said converted electrical signal.

3. A signal light interruption detecting method according to claim 1, further comprising:
    generating a direct-current signal whose voltage level is changed according to the amplitude of said extracted frequency component,
    wherein said detecting detects that said signal light is not inputted to said optical amplifier when the voltage level of said generated direct-current signal becomes lower than a previously set reference voltage.

4. An optical amplifier, which supplies a pumping light to an amplification medium to amplify a framed signal light propagated through said amplification medium, comprising:
   a branching section that branches a portion of an inputted light as a monitor light;
   a light receiving section that receives the monitor light branched by said branching section and converts the received monitor light into an electrical signal;
   an extracting section that extracts a frequency component corresponding to a period at which a header area of said signal light appears, from the electrical signal;
   a detecting section that detects whether or not said signal light is inputted, based on the amplitude of the frequency component extracted by said extracting section; and
   a control section that executes a shut-down control of the pumping light when said detecting section detects that the signal light is not inputted.

5. An optical amplifier according to claim 4, wherein
   the amplification medium is a transmission fiber, and the pumping light is provided to the transmission fiber so that said signal light is amplified by Raman effect as the signal light propagates through said transmission fiber, and
   said branching section branches a portion of light outputted from said transmission fiber as the monitor light.

6. An optical amplifier according to claim 4, wherein the amplification medium is a rare-earth element doped fiber, and the pumping light is supplied to the rare-earth element doped fiber, to amplify said signal light as said signal light propagates through said rare-earth element doped fiber, with stimulated emission.

7. An optical amplifier according to claim 4, wherein one frame period of said signal light is 125 ms, and
   said extracting section extracts a frequency component of 8 kHz from the electrical signal converted by said light receiving section.

8. An optical amplifier according to claim 4, wherein
   said extracting section includes a bandpass filter whose center frequency of a passband coincides with a frequency corresponding to the period at which the header area of said signal light appears, and a direct-current conversion circuit converting a signal passed through said bandpass filter into a direct-current signal, and
   said detecting section detects that said signal light is not inputted when a voltage signal of the direct-current signal output from said direct-current conversion circuit becomes lower than a previously set reference voltage.

9. An optical amplifier according to claim 4, wherein
   said extracting section includes a lock-in amplifier operating in accordance with a reference signal having a frequency corresponding to the period at which the header area of said signal light appears, and
   said detecting section detects that said signal light is not inputted when a voltage signal of a direct-current signal output from said lock-in amplifier becomes lower than a previously set reference voltage.

10. An optical amplifier according to claim 4, wherein
    said extracting section includes an A/D conversion circuit converting the electrical signal into a digital signal, and a digital filter extracting the frequency component corresponding to the period at which the header area of said signal light appears, from the digital signal, and
    said detecting section detects whether or not said signal light is inputted in accordance with a previously set reference value.

11. A method comprising:
    inputting a light to an optical amplifier so that the optical amplifier amplifies the light;
    branching a portion of the light;
    converting the branched portion into an electrical signal;
    extracting a frequency component corresponding to a period at which a header area of a framed signal light appears, from the electrical signal; and
    determining whether or not the framed signal light is inputted to the optical amplifier, based on an amplitude of the extracted frequency component.

12. A method according to claim 11, wherein
    one frame period of the signal light is 125 ms, and
    said extracting extracts a frequency component of 8 kHz from the electrical signal.

13. A method according to claim 11, further comprising:
    generating a direct-current signal having a voltage level that changes according to the amplitude of the extracted frequency component,
    wherein said determining determines that the framed signal light is not inputted to the optical amplifier when the voltage level of the generated direct-current signal becomes lower than a previously set reference voltage.

14. A method according to claim 11, wherein the optical amplifier comprises an optical amplification medium supplied with pumping light to cause the framed signal light to be amplified via Raman amplification as the framed signal light propagates through the optical amplification medium.

15. A method according to claim 14, further comprising:
    shutting down the supply of pumping light to the optical amplification medium when it is determined that the framed signal light is not inputted to the optical amplifier.

16. A method according to claim 11, wherein the optical amplifier comprises a rare earth element doped fiber supplied with pumping light to cause the framed signal light to be amplified as the framed signal light propagates through the rare earth element doped fiber.

17. A method according to claim 16, further comprising:
    shutting down the supply of pumping light to the rare earth element doped fiber when it is determined that the framed signal light is not inputted to the optical amplifier.

18. An apparatus comprising:
    means for inputting a light to an optical amplifier so that the optical amplifier amplifies the light;
    means for branching a portion of the light;
    means for converting the branched portion into an electrical signal;
    means for extracting a frequency component corresponding to a period at which a header area of a framed signal light appears, from the electrical signal; and
    means for determining whether or not the framed signal light is inputted to the optical amplifier, based on an amplitude of the extracted frequency component.

19. An apparatus according to claim 18, wherein
    the optical amplifier comprises an optical amplification medium supplied with pumping light to cause the framed signal light to be amplified via Raman amplification as the framed signal light propagates through the optical amplification medium, and the apparatus further comprises means for shutting down the supply of pump light to the optical amplification medium when it is determined that the framed signal light is not inputted to the optical amplifier.

20. An apparatus according to claim 18, wherein the optical amplifier comprises a rare earth element doped fiber supplied with pumping light to cause the framed signal light to be amplified as the framed signal light propagates through the rare earth element doped fiber, and the apparatus further comprises means for shutting down the supply of pump light to the rare earth element doped fiber when it is determined that the framed signal light is not inputted to the optical amplifier.

* * * * *

UNITED STATES PATENT AND TRADEMARK OFFICE
CERTIFICATE OF CORRECTION

PATENT NO. : 7,132,646 B2
APPLICATION NO. : 10/901985
DATED : November 7, 2006
INVENTOR(S) : Yuji Tamura It is certified that error appears in the above-identified patent and that said Letters Patent is hereby corrected as shown below:

Column 8, Line 59, change "ms," to --$\mu$s,--.

Column 9, Line 36, change "ms," to --$\mu$s,--.

Column 10, Line 16, change "ms," to --$\mu$s,--.

Signed and Sealed this

Tenth Day of April, 2007

JON W. DUDAS
*Director of the United States Patent and Trademark Office*